(12) United States Patent
Park

(10) Patent No.: US 11,198,799 B2
(45) Date of Patent: Dec. 14, 2021

(54) COMPOSITION FOR REACTIVE HOT MELT RESIN AND REACTIVE HOT MELT FILM PREPARED FROM THE RESIN

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 323 days.

(21) Appl. No.: 15/945,825

(22) Filed: Apr. 5, 2018

(65) Prior Publication Data

US 2018/0298237 A1     Oct. 18, 2018

Related U.S. Application Data

(63) Continuation of application No. PCT/KR2017/010126, filed on Sep. 15, 2017.

(30) Foreign Application Priority Data

| Oct. 14, 2016 | (KR) | 10-2016-0133849 |
| Jul. 10, 2017 | (KR) | 10-2017-0086961 |
| Aug. 9, 2017 | (KR) | 10-2017-0100958 |

(51) Int. Cl.
  *C09J 7/35* (2018.01)
  *C09J 7/40* (2018.01)
  (Continued)

(52) U.S. Cl.
  CPC ....... *C09J 7/35* (2018.01); *B05D 5/10* (2013.01); *C08G 18/807* (2013.01);
  (Continued)

(58) Field of Classification Search
  CPC ....... C09J 7/35; C09J 7/405; C09J 7/10; C09J 5/06; C09J 11/04; C09J 175/04;
  (Continued)

(56) References Cited

U.S. PATENT DOCUMENTS

2006/0247376 A1* 11/2006 Hasegawa ........... C08J 3/243
                                             525/123
2014/0302269 A1* 10/2014 Buckanin ........... B82Y 30/00
                                             428/40.2

FOREIGN PATENT DOCUMENTS

KR     101075373 B1 * 10/2011
KR     101622324 B1 *  5/2016 ........... C09J 153/02

OTHER PUBLICATIONS

KR101075373 B1—machine translation (Year: 2011).*
(Continued)

*Primary Examiner* — Ling Siu Choi
*Assistant Examiner* — Ronald Grinsted
(74) *Attorney, Agent, or Firm* — Park & Associates IP Law, P.C.

(57) ABSTRACT

Disclosed is a composition for reactive hot melt resin and a reactive hot melt film prepared from the resin, which resin composition includes a polyurethane resin having a linear structure, an isocyanate blocking agent having a plurality of functional groups, a reaction catalyst, a reaction retardant, etc. Preferably, the resin composition includes a polyurethane resin and an isocyanate blocking agent used as a latent curing agent, which are main components; a catalyst for accelerating the reaction; and a reaction retardant for securing long-term storability.

Particularly, the composition for reactive hot melt resin further includes a heat-resistance enhancer, preferably nano-silica, for preventing the resin from melting down during no-sew press treatment to provide a performance to help maintenance of adhesion.

19 Claims, 2 Drawing Sheets

(51) Int. Cl.
  *C09J 7/10*     (2018.01)
  *B05D 5/10*     (2006.01)
  *C08G 18/80*    (2006.01)
  *C09J 5/06*     (2006.01)
  *C09J 11/04*    (2006.01)
  *C09J 175/04*   (2006.01)
  *C08K 3/36*     (2006.01)

(52) U.S. Cl.
  CPC ..... *C08G 18/8074* (2013.01); *C08G 18/8077* (2013.01); *C08G 18/8093* (2013.01); *C09J 5/06* (2013.01); *C09J 7/10* (2018.01); *C09J 7/405* (2018.01); *C09J 11/04* (2013.01); *C09J 175/04* (2013.01); *C08G 2170/20* (2013.01); *C08G 2170/80* (2013.01); *C08K 3/36* (2013.01); *C08K 2201/011* (2013.01); *C09J 2301/304* (2020.08); *C09J 2301/408* (2020.08); *C09J 2400/10* (2013.01); *C09J 2475/00* (2013.01)

(58) Field of Classification Search
  CPC .............. C09J 2201/61; C09J 2205/102; C09J 2400/10; C09J 2475/00; B05D 5/10; C08G 18/807; C08G 18/8074; C08G 18/8077; C08G 18/8093; C08G 2170/20; C08G 2170/80; C08K 3/36; C08K 2201/011
  USPC ......................................................... 524/493
  See application file for complete search history.

(56) References Cited

OTHER PUBLICATIONS

KR101622324 B1—machine translation (Year: 2016).*
Wang et al., :Effect of Nanosilica Content on Properties of Polyurethane/ Silica Hybrid Emulsion and Its Films, (J. Appl. Polym. Sci., vol. 119, p. 3521-3530 (2011). (Year: 2011).*

* cited by examiner

COMPOSITION FOR REACTIVE HOT MELT RESIN AND REACTIVE HOT MELT FILM PREPARED FROM THE RESIN

REFERENCE TO RELATED APPLICATIONS

This is a continuation of pending International Patent Application PCT/KR2017/010126 filed on Sep. 15, 2017, which designates the United States and claims priority of Korean Patent Application No. 10-2016-0133849 filed on Oct. 14, 2016, Korean Patent Application No. 10-2017-0086961 filed on Jul. 10, 2017, and Korean Patent Application No. 10-2017-0100958 filed on Aug. 9, 2017, the entire contents of which are incorporated herein by reference.

FIELD OF THE INVENTION

The present invention relates to a composition for reactive hot melt resin and a reactive hot melt film prepared from the resin, and more particularly to a composition for reactive hot melt resin and a reactive hot melt film prepared from the resin that is designed to have excellent heat resistance by changing thermal properties from thermoplastic to thermosetting properties upon heat press treatment.

BACKGROUND OF THE INVENTION

As well known in the art, hot melt films are thermoplastic films that are prepared by applying a coating of hot melt resin to a typical release liner paper. Such hot melt films bond and adhere any two substrate materials together. Upon heating and pressing, a hot melt film disposed between two substrate materials melts and adheres to the surface of the substrate materials, bonding the two substrate materials together.

The hot melt films for this use purpose are typically formulated from polymers, such as polyurethane, polyethylene, polyethylene vinyl acetate, polyester, polyamide, etc. In recent years, an adhesive laminating process using hot melt films has become popular in a wide range of applications, because it is favorable to the automated lamination process, eco-friendly, and simpler than bonding two materials with a liquid-state adhesive like a solvent-type adhesive or a water-based adhesive or sewing two textiles together.

The hot melt films are mostly thermoplastic; that is, they can be heated and pressed onto a substrate and remelted when heated and pressed again. With such a property, the hot melt films are reprocessable and likely to have an undesired thermal deformation.

The temperature available for thermal deformation is a significant factor in the choice of hot melts and a major determinant of the thermal resistance of the final product. In this case, the hot melts are reactive hot melts aside from thermoplastic hot melts.

A typical reactive hot melt has a functional group reactive to heat and moisture in the polymer structure. Once applied to a substrate, it gradually undergoes a reaction and gets cured. Particularly, a polyurethane-based hot melt having an isocyanate group is directly reactive to moisture or a substrate material and cured upon applied to the substrate material. But, such a hot melt has fundamental problems that it is hard to cast in the form of a film and highly prone to degeneration during storage.

SUMMARY OF THE INVENTION

It is an object of the present invention to provide a composition for reactive hot melt resin and a reactive hot melt film prepared from the resin that is designed to have excellent heat resistance by changing thermal properties from thermoplastic to thermosetting properties upon heat press treatment.

It is another object of the present invention to provide a reactive hot melt film prepared by applying a coating of the reactive hot melt resin to a release liner paper, making the hot melt film easy to handle in the form of a film and excellent in long-term storability.

According to the present invention, there is provided a composition for reactive hot melt resin that includes: a polyurethane resin and an isocyanate blocking agent used as a latent curing agent, which are main components; a catalyst for accelerating the reaction; a reaction retardant for securing long-term storability; and a heat-resistance enhancer (preferably, nanosilica) for preventing the resin from melting down during no-sew press treatment to provide a performance to help maintenance of adhesion.

Preferably, the isocyanate blocking agent used as a latent curing agent remains inactive, that is, not reactive to the polyurethane resin, in general storage conditions below 40° C., showing high storability, and gets activated to undergo a reaction with the polyurethane resin in high-temperature conditions during heat press treatment.

In particular, the present invention greatly enhances the viscosity at no-sew temperatures by using the heat-resistance enhancer (preferably, nanosilica) so that a sufficient amount of polyurethane resin can remain in the substrate interface after no-sew press treatment, which prevents the polyurethane resin from over-penetrating into the substrate materials.

According to the present invention, there is also provided a reactive hot melt film prepared by applying a coating of a reactive hot melt resin using the composition (preferably, an isocyanate blocking agent and nanosilica) to a typical release liner paper.

DETAILED DESCRIPTION OF THE INVENTION

Figure 1:
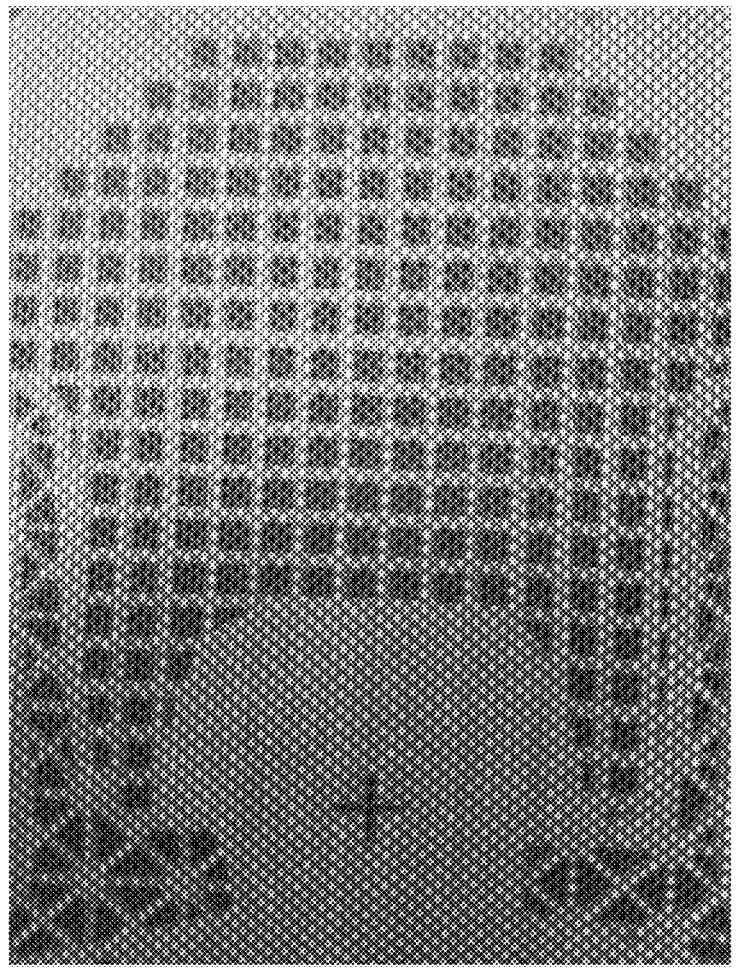
FIG. 1 is a photograph showing a surface structure of a sample product constructed according to the prior art method, in which the 3D embossing effect is not clearly appearing due to the remelting of the reactive hot melt resin in the applied fabric during the non-sewing press work.

The present invention provides a high performance of heat resistance by changing thermal properties from thermoplastic to thermosetting properties upon hot press treatment and also secures a high performance of hydrolysis resistance in addition to excellences in shape stability and adhesion at high temperatures due to the high performance of heat resistance. By using a reaction catalyst, the present invention has a curing reaction sufficiently effective even in a relatively short time of heat press treatment.

According to the present invention, the composition for reactive hot melt resin includes a polyurethane resin, an isocyanate blocking agent, and a heat-resistance enhancer.

Hereinafter, the present invention will be described in further detail with reference to the preferred embodiments in order for those skilled in the art to embody the present invention with ease. In the following description of the present invention, a detailed description of other embodiments of the present invention will be omitted when it may make the subject matter of the present invention rather unclear.

The composition for reactive hot melt resin and the reactive hot melt film prepared from the resin according to the present invention may include a polyurethane resin having a linear structure, an isocyanate blocking agent having a plurality of functional groups, a reaction catalyst, a reaction retardant, etc. Preferably, the composition for reactive hot melt resin according to the present invention may include: a polyurethane resin and an isocyanate blocking agent used as a latent curing agent, which are main components; a catalyst for accelerating the reaction; and a reaction retardant for securing long-term storability.

Particularly, the composition for reactive hot melt resin according to the present invention may further include a heat-resistance enhancer, preferably nanosilica, for preventing the resin from melting down during no-sew press treatment to provide a performance to help maintenance of adhesion.

The reactive hot melt resin of the present invention formulated from the composition (specifically, the isocyanate blocking agent and nanosilica) and the reactive hot melt film of the present invention prepared by applying a coating of the resin to a typical release liner paper are thermoplastic before heat press treatment and thermosetting after heat press treatment, that is, not remelted when heated again after the heat press treatment.

The types of the isocyanate blocking agent used in the composition for reactive hot melt resin according to the present invention are as given in Table 1.

TABLE 1

| Type | Dissociation Temp. | Melting Temp. | Boiling Temp. | Feature |
|---|---|---|---|---|
| MEKO* | 140~160° C. | −30° C. | 150° C. | Applied as an adhesive to hard materials like metals. |
| DMP* | 110~120° C. | 218° C. | 218° C. | Applied as an adhesive to soft materials like fabrics, mainly to water-soluble products. |
| DEM* | 100~120° C. | 199° C. | 199° C. | Dissociated at low temperatures, so prone to dissociation during storage |
| DIPA* | 140~150° C. | 249° C. | 249° C. | |
| E-CAP* | 160~180° C. | 138° C. | 138° C. | |

MEKO: Methylethylketoxime
DMP: Dimethylpyrazole
DEM: Diethylmalonate
DIPA: Diisopropylamine
E-CAP: Caprolactam As can be seen from Table 1, the isocyanate blocking agent has different activation temperatures depending on its type. For example, methylethylketoxime (MEKO), activated at around 150° C., is applicable to materials stable at high temperatures; and dimethylpyrazole (DMP), activated at around 110° C., is applicable to fabric materials that are vulnerable to heat. The DMP type isocyanate blocking agent is a latent curing agent most suitable for the materials not having a high performance of heat resistance like materials for shoe.

The activation temperature of the isocyanate blocking agent refers to the temperature at which active dissociation takes place. The dissociation begins at a temperature lower than the activation temperature by at least 20 to 30° C., and this temperature has the greatest impact on the storage stability of the final hot melt film. Namely, in the case of a long-term storage at high temperature of 50° C. or above, the hot melt film prepared by applying a coating of the hot melt resin using the DMP type isocyanate blocking agent to a typical release liner paper undergoes a gradual progress of dissociation and curing reaction and becomes unusable. Particularly, in the presence of a catalyst for accelerating the rate of the curing reaction, the curing reaction becomes faster, making it difficult to store the hot melt film for more than 24 hours.

For this reason, the present invention uses a reaction retardant to improve such a storage issue. The reaction retardant, used in combination with the reaction catalyst, inhibits the activation of the catalyst during the storage, retarding the reaction between the isocyanate blocking agent and the polyurethane resin to the maximum, and becomes volatile at high temperatures to resume the activation of the catalyst, increasing the rate of the reaction between the isocyanate blocking agent and the polyurethane resin.

According to a heat press test on fabrics, the hot melt resin using an isocyanate blocking agent has adhesion enhanced in comparison to the hot melt resin not using any isocyanate blocking agent. This demonstrates the fact that the isocyanate blocking agent is activated in the heat press environments to cause a curing reaction with the polyurethane resin. In addition, a dead load test for evaluating the heat resistance of adhesive materials shows that the hot melt resin using an isocyanate blocking agent is significantly enhanced in the heat resistance relative to the hot melt resin not using any isocyanate blocking agent. Namely, the hot melt resin is changed in thermal properties from thermoplastic to thermosetting properties upon heat press treatment. As can be seen from the results of the tests, the function of the reaction catalyst is of great importance in incurring a quick reaction of the isocyanate blocking agent through a short time of heat press treatment, and the use of the reaction retardant contributes to a great increase in the high-temperature storability.

Particularly, the present invention uses a heat-resistance enhancer in the preparation of a reactive hot melt resin. The use of the heat-resistance enhancer is to help maintain the adhesion without melting down the resin in the conventional no-sew press treatment. More specifically, it is to greatly enhance the viscosity at no-sew temperatures so that a sufficient amount of the polyurethane resin can remain in the substrate interface after the no-sew press treatment to prevent the polyurethane resin from over-penetrating into the substrate material. The heat-resistance enhancer as used herein is preferably nanosilica.

The validation methods for the composition for reactive hot melt resin and the reactive hot melt film prepared by applying a coating of the resin to a typical release liner paper according to the present invention are specifically presented in the following Table 2.

TABLE 2

| Div. | TPU hot melt | Composition 1 | Composition 2 | Composition 3 | Composition 4 |
|---|---|---|---|---|---|
| Water-borne polyurethane 1 | | | | 100 | 100 |
| Water-borne polyurethane 2 | | 100 | 100 | | |
| DMP | | | | 2.5 | 5 |
| Catalyst | | | | 1 | 1 |
| Retardant | | | | 1 | 1 |
| Heat-resistance enhancer | | | | | |
| Adhesion (average, kgf/cm) | 1.5 | 1.5 | 1.1 | 3 | 3.1 |
| Heat resistance (sec.) | 55 | <10 | <6 | 45 | 44 |
| Flow beginning temperature (° C.) | 116 | 82 | 60 | 69 | 73 |
| Viscosity (cps@130° C.) | 100,000 | 600,000 | <20,000 | 50,000 | 40,000 |

| Div. | Composition 5 | Composition 6 | Composition 7 | Composition 8 | Composition 9 |
|---|---|---|---|---|---|
| Water-borne polyurethane 1 | 100 | | 50 | 100 | 100 |
| Water-borne polyurethane 2 | | 100 | 50 | | |
| DMP | 10 | 5 | 5 | 5 | 5 |
| Catalyst | 1 | 1 | 1 | 1 | 1 |
| Retardant | 1 | 1 | 1 | 1 | 1 |
| Heat-resistance enhancer | | | | 5 | 8 |
| Adhesion (average, kgf/cm) | 2.6 | 2.2 | 1.1 | 3 | 3.1 |
| Heat resistance (sec.) | 47 | 15 | <6 | 45 | 95 |
| Flow beginning temperature (° C.) | 71 | 56 | 60 | 69 | 85 |
| Viscosity (cps@130° C.) | 30,000 | <20,000 | 28,000 | 76,000 | 300,000 |

1. Adhesion Testing

A. Purpose of testing: The adhesion testing is for evaluating the present invention in regards to the enhancement of adhesion in comparison to the conventional thermoplastic polyurethane hot melt.

B. Fabric substrate: Polyester Jacquard fabric

C. Heat press condition (a) Condition 1: 35 kgf, 130° C., 30 sec. (low-pressure press condition)

(b) Condition 2: 70 kgf, 130° C., 30 sec. (the conventional no-sew press condition)

D. Applied compositions: Compositions 1 to 7 using no heat-resistance enhancer

E. Applied compositions: Compositions 8 and 9 using a heat-resistance enhancer and a conventional TPU hot melt F. Evaluation of adhesion: All the hot melt films were 100 μm thick, cut to one inch in width after one-day heat press treatment, and evaluated with a tensile tester.

G. Results: The compositions 3 to 9 were all excellent in adhesion in comparison to the conventional thermoplastic hot melt film. As for the compositions 1 to 7 upon hot press treatment under the condition 2 (the conventional no-sew press condition), the hot melts were all melted down to over-penetrate into the fabric substrates, resulting in very low adhesive strength of less than 1 kgf/cm.

2. Heat Resistance Testing

A. Purpose of testing: The heat resistance of the resin increases as the reactive hot melt film starts to undergo a reaction upon heat press treatment and gets cured. The heat resistance testing is for evaluating the heat resistance of the resin. For the evaluation, a load of 1 kg is applied to the one end of a fabric substrate adhered to the other in a high-temperature oven, and the time required for the ends of the fabric substrate to peel apart is measured.

B. The fabric substrate after heat press treatment was cut into a fabric piece one inch wide and 15 cm long. With a load of 1 kg attached to its one end, the fabric piece was put into an oven at 130° C., and the time required for the ends to completely peel apart was measured.

C. Results: The compositions 8 and 9 were superior in heat resistance to the conventional thermoplastic polyurethane hot melt.

3. Flow Beginning Temperature Testing

A. Purpose of testing: The testing is for determining the temperature available for heat press treatment. For the determination, the temperature for the resin to start to flow is measured at increasing temperatures with a defined load.

B. A capillary rheometer was used to measure the temperature at which the hot melt film began to flow.

4. Viscosity

A. It is important to find out a hot melt film composition having a similar viscosity to the conventional thermoplastic polyurethane hot melt film at a typical heat press temperature, 130° C. This contributes to the enhancement of use convenience, as the hot melt film composition of a similar viscosity to the conventional thermoplastic polyurethane hot melt film is applicable without modifying the heat press condition.

B. Results: The use of a heat-resistance enhancer greatly increased the viscosity at no-sew temperature condition, 130° C.; hence, good adhesion was secured after no-sew treatment under the same condition of the conventional thermoplastic polyurethane hot melt film.

A material having fabrics adhered together with a foam material in between (hereinafter, referred to as "foam package") that is commonly used for shoe upper consists of fabrics glued to the front and back sides of a foam material. The foam package is patterned through a punching process, cut into a desired pattern, and used as a material for shoe upper or the like. As for the foam package material, the most important factors are air permeability of the foam package material adhered to the fabric and adhesion with the fabric. The foam package material using the conventional thermoplastic hot melt film is poor in air permeability. Upon no-sew press treatment for forming a 3D embossed surface according to a shoe design, a 3D pattern is embossed on the foam package material with double-sided adhesion. But, a second no-sew press treatment for adhering a logo design or another pattern to the foam package material results in having the thermoplastic hot melt film remelted, making the 3D embossed relief disappear.

In a conventional method given as a solution to this problem, a fabric or foam substrate is coated with a moisture-curable polyurethane hot melt resin, polyurethane reactive (PUR), rather than a film-type hot melt. But, the moisture-curable resin is poor in use stability and not effective in making a 3D embossed relief.

For solving these problems with the prior art, the present invention includes a first step of applying a coating of the reactive hot melt resin alone directly to the fabric substrate rather than casting the reactive hot melt resin in the form of a film and a second step of performing a no-sew press treatment. According to the present invention, good air permeability can be secured by adhering a resin-coated fabric to a foam material without using a resin in the form of a film. Further, the isocyanate blocking agent contained in the reactive hot melt resin composition provides the thermosetting property for the resin composition upon no-sew press treatment, that is, preventing the reactive hot melt resin composition from remelting in the processes subsequent to the press treatment, thereby having the 3D embossed relief remain on the surface.

In addition, the heat-resistance enhancer, preferably nanosilica, used in the reactive hot melt resin prevents the resin from over-penetrating into the fabric or foam material under high pressure (30 kgf or above) in the no-sew press treatment. This does not make the adhesion unstable but secures good adhesion. The related testing procedures are specified in FIGS. 1-2 and Table 3.

Figure 2:
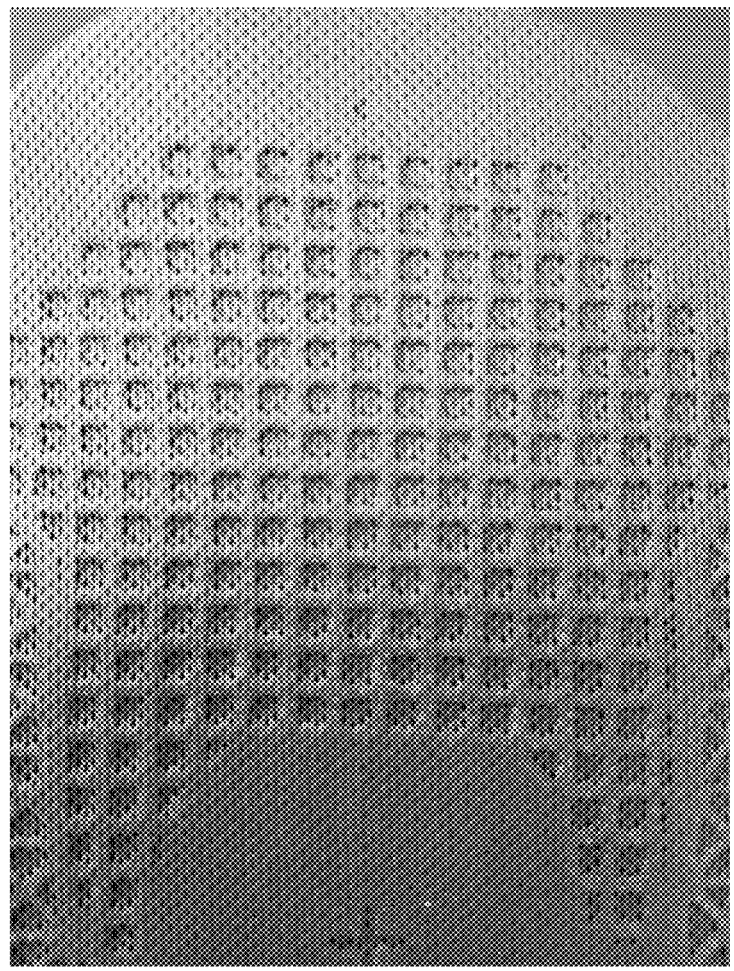
FIG. 2 is a photograph showing a surface structure of a sample product constructed according to a preferred embodiment of the present invention, in which the 3D embossing effect is clearly displayed when the non-sewn press work is performed on the fabric coated with the reactive hot-melt resin.

As can be seen from FIGS. 1 and 2, using the conventional polyurethane hot melt film or polyurethane hot melt resin causes the film to remelt or leads to poor use stability of the moisture-curable resin, so that a 3D embossed relief does not appear. In contrast, the use of nanosilica as a heat-resistance enhancer in the preparation of a reactive hot melt resin according to the present invention realizes a definitely raised 3D embossed relief as shown in the FIG. 2.

TABLE 3

| Div. | TPU hot melt | PUR hot melt |
|---|---|---|
| Water-borne polyurethane 1 | 100 | 100 |
| Water-borne polyurethane 2 | | |
| DMP | | |
| Catalyst | | |
| Retardant | | |
| Heat-resistance enhancer | | |
| Heat resistance (sec.) | 55 | <10 |
| Flow beginning temperature (° C.) | 116 | 74 |
| Viscosity (cps@130° C.) | 100,000 | 10,000 |
| Thickness (μm) | 50 | 30 |
| Air permeable? | No | Yes |
| 3D embossed relief (immediately after no-sew press treatment) | Good | Not molded |
| 3D embossed relief (after second and third no-sew press treatment) | Not effective | Not molded |
| Adhesive strength (kgf/cm) | 0.8 | 1.2 |

| | Composition | | | |
|---|---|---|---|---|
| Div. | 5 | 6 | 7 | 8 |
| Water-borne polyurethane 1 | 100 | | 100 | 100 |
| Water-borne polyurethane 2 | | 100 | | |
| DMP | 10 | 5 | 5 | 5 |
| Catalyst | 1 | 1 | 1 | 1 |
| Retardant | 1 | 1 | 1 | 1 |
| Heat-resistance enhancer | | | 5 | 8 |
| Heat resistance (sec.) | 47 | 15 | 82 | 95 |
| Flow beginning temperature (° C.) | 71 | 56 | 80 | 85 |
| Viscosity (cps@130° C.) | 30,000 | <20,000 | 76,000 | 300,000 |
| Thickness (μm) | 30 | 30 | 30 | 30 |
| Air permeable? | Yes | Yes | Yes | Yes |

The following description will be given as to the specific validation methods and the results of tests for verifying the physical properties of the composition for reactive hot melt resin according to the present invention as presented in Table 3, preferably for determining the physical properties of the composition for manufacturing a reactive hot melt resin in the case of using a heat-resistance enhancer (namely, nanosilica).

1. Adhesion Testing

A. Purpose of testing: The adhesion testing is for evaluating the present invention in regards to the enhancement of adhesion in comparison to the conventional thermoplastic polyurethane hot melt.

B. Fabric substrate: Polyester fabric and PU foam (front and back sides)

C. Heat press condition: 60 kgf, 130° C., 30 sec.

D. Applied compositions: Refer to Table 3.

E. Evaluation of adhesion: All the hot melt films were 50 μm thick, cut to one inch in width after one-day heat press treatment, and evaluated with a tensile tester.

F. Results: Both the compositions 8 and 9 were excellent in adhesion in comparison to the conventional thermoplastic hot melt film and the PUR hot melt adhesive. As for the compositions 5 and 6 using no heat-resistance enhancer upon hot press treatment, the hot melts were all melted down to over-penetrate into the fabric substrates, resulting in very low adhesive strength of less than 1 kgf/cm.

2. Heat Resistance Testing

A. Purpose of testing: The heat resistance of the resin increases as the reactive hot melt film starts to undergo a reaction upon heat press treatment and gets cured. The heat resistance testing is for evaluating the heat resistance of the resin. For the evaluation, a load of 1 kg is applied to the one end of a fabric substrate adhered to the other in a high-temperature oven, and the time required for the ends of the fabric substrate to peel apart is measured.

B. The fabric substrate after heat press treatment was cut into a fabric piece one inch wide and 15 cm long. With a load of 1 kg attached to its one end, the fabric piece was put into an oven at 130° C., and the time required for the ends to completely peel apart was measured.

C. Results: The compositions 8 and 9 were superior in heat resistance to the conventional thermoplastic polyurethane hot melt.

3. Flow Beginning Temperature Testing

A. Purpose of testing: The testing is for determining the temperature available for heat press treatment. For the determination, the temperature for the resin to start to flow is measured at increasing temperatures with a defined load.

B. A capillary rheometer was used to measure the temperature at which the hot melt film began to flow.

4. Viscosity

A. It is important to find out a hot melt film composition having a similar viscosity to the conventional thermoplastic polyurethane hot melt film at a typical heat press temperature, 130° C. This contributes to the enhancement of convenience as the hot melt film composition of a similar viscosity to the conventional thermoplastic polyurethane hot melt film is applicable without modifying the heat press condition.

B. Results: The use of a heat-resistance enhancer greatly increased the viscosity at no-sew temperature condition, 130° C.; hence, good adhesion was secured after no-sew treatment under the same condition of the conventional thermoplastic polyurethane hot melt film.

According to the results of the tests, the reactive hot melt resin and the reactive hot melt film prepared by applying a coating of the resin to a typical release liner paper according to the present invention are superior in adhesion, heat resistance, and viscosity to the conventional thermoplastic polyurethane hot melt film or polyurethane reactive (PUR) resin. The components and their functions of the present invention can be specifically described as follows:

1. Water-borne polyurethane 1: Polyether-based polyurethane used as an adhesive resin with a melting point of 45 to 55° C., a weight average molecular weight of about 150,000 according to the molecular weight measurement using GPC, and a viscosity (at 130° C.) of about 60,000 cps.

2. Water-borne polyurethane 2: Polyether-based polyurethane used as an adhesive resin with a melting point of 45 to 55° C., a weight average molecular weight of about 100,000 according to the molecular weight measurement using GPC, and a viscosity (at 130° C.) of about 20,000 cps.

3. DMP block latent curing agent: Non-yellowing curing agent prepared by blocking an isocyanate group with dimethyl pyrazole in HDI or IPDI trimer.

4. Catalyst: Metal catalysts based on tin, titanium, bismuth, etc. are available, but a bismuth-based catalyst with a high rate of reaction and under no restriction is used in the tests.

5. Retardant: In interaction with metal catalysts to retard the catalytic activity at low temperatures. Typical urethane reaction retardants are acid substances that retard the start of the urethane reaction at low temperatures but adversely lower the whole reaction rate even at high temperatures at which an adequate reaction rate is expected. 2,4-pentanedione is not only excellent in retarding performance at room temperature, but also effective in sufficiently restoring the activity of the metal catalysts under no-sew conditions.

6. Heat-resistance enhancer: Nanosilica is preferred. The water-borne polyurethanes 1 and 2 have the lower viscosity than the conventional thermoplastic hot melt under no-sew conditions, that is, 130° C. and pressure of 70 kgf, so they are prone to over-penetrate into the substrate material due to low viscosity upon no-sew heat press treatment under the same conditions. The over-penetration of the resins causes a deterioration of adhesion. For prevention of the over-penetration, it is necessary to reduce the temperature or the pressure, which leads to a drastic deterioration of usability. In the present invention, the nanosilica additive functions to greatly increase the viscosity at no-sew temperatures of the water-borne polyurethane resins, so a sufficient amount of the resins can remain in the substrate interface after no-sew heat press treatment. Further, the nanosilica can secure usability, namely use convenience, as it is directly applicable to the no-sew heat press treatment under the same conditions of the conventional thermoplastic hot melt resin. Preferably, the nanosilica used as a heat-resistance enhancer in the present invention has a size of about 5 to 50 nm.

What is claimed is:

1. A composition for reactive hot melt resin, consisting of a polyurethane resin, an isocyanate blocking agent, a heat-resistance enhancer, a metal catalyst for accelerating a rate of a curing reaction, and a reaction retardant for securing a long-term stability.

2. The composition for reactive hot melt resin as claimed in claim 1, wherein the heat-resistance enhancer is nanosilica, having a size of 5 to 50 nm.

3. The composition for reactive hot melt resin as claimed in claim 1, wherein the reactive hot melt resin is converted from having thermoplastic properties to having thermosetting properties upon a heat press treatment.

4. The composition for reactive hot melt resin as claimed in claim 1, wherein the metal catalyst is a bismuth-based catalyst.

5. The composition for reactive hot melt resin as claimed in claim 1, wherein the reaction retardant is 2,4-pentanedione.

6. The composition for reactive hot melt resin as claimed in claim 1, wherein the isocyanate blocking agent is a dimethylpyrazole (DMP) activated at about 110°.

7. A reactive hot melt film prepared by applying a coating of the reactive hot melt resin as claimed in claim 1 to a release liner paper.

8. The composition for reactive hot melt resin as claimed in claim 1, wherein the isocyanate blocking agent is selected from a group consisting of methylethylketoxime (MEKO), diethyl malonate (DEM), diisopropylamine (DIPA) and caprolactam (E-CAP).

9. The composition for reactive hot melt resin as claimed in claim 1, wherein the isocyanate blocking agent is a material that modifies a thermal property of the reactive hot melt resin from thermoplastic to thermosetting properties upon heat press treatment.

10. The composition for reactive hot melt resin as claimed in claim 1, wherein the polyurethane resin is a polyether-based polyurethane with a melting point of 45 to 55° C.

11. The composition for reactive hot melt resin as claimed in claim 10, wherein the polyurethane resin is a polyether-based polyurethane with a weight average molecular weight of about 150,000 and a viscosity of about 60,000 cps at 130° C.

12. The composition for reactive hot melt resin as claimed in claim 10, wherein the polyurethane resin is a polyether-based polyurethane with a weight average molecular weight of about 100,000 and a viscosity of about 20,000 cps at 130° C.

13. The composition for reactive hot melt resin as claimed in claim 1, wherein the metal catalyst is selected from a group consisting of a tin-based catalyst, titanium-based catalyst and a bismuth-based catalyst.

14. The composition for reactive hot melt resin as claimed in claim 1, wherein the reaction retardant is configured to inhibit activity of the metal catalyst at a temperature of 40° C. and below.

15. A reactive hot melt film comprising:
a release liner paper; and
a reactive hot melt resin coated on the release liner paper, wherein the reactive hot melt resin consists of a polyurethane resin, an isocyanate blocking agent, a heat-resistance enhancer, a metal catalyst and a reaction retardant.

16. The reactive hot melt film of claim 15, wherein the polyurethane resin is a polyether-based polyurethane.

17. The reactive hot melt film of claim 15, wherein the isocyanate blocking agent is selected from a group consisting of methylethylketoxime (MEKO), dimethylpyrazole (DMP), diethylmalonate (DEM), diisopropylamine (DIPA) and caprolactam (E-CAP).

18. The reactive hot melt film of claim 15, wherein the metal catalyst is selected from a group consisting of a tin-based catalyst, titanium-based catalyst and a bismuth-based catalyst.

19. The reactive hot melt film of claim 15, wherein the isocyanate blocking agent is a dimethylpyrazole (DMP), the heat-resistance enhancer is nanosilica, the metal catalyst is a bismuth-based catalyst and the reaction retardant is 2,4-pentanedione.

* * * * *